(12) United States Patent
Suzuki et al.

(10) Patent No.: US 7,055,943 B2
(45) Date of Patent: Jun. 6, 2006

(54) INK SET FOR INK-JET RECORDING, RECORDING UNIT, INK-JET RECORDING APPARATUS AND INK-JET RECORDING METHOD

(75) Inventors: Mariko Suzuki, Kanagawa (JP); Shoji Koike, Kanagawa (JP); Makoto Aoki, Kanagawa (JP); Koromo Shirota, Kanagawa (JP); Hideki Takayama, Kanagawa (JP); Yasuhiro Nito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/214,584

(22) Filed: Aug. 9, 2002

(65) Prior Publication Data

US 2003/0071883 A1   Apr. 17, 2003

(30) Foreign Application Priority Data

Aug. 22, 2001 (JP) ............................. 2001-251699
Aug. 22, 2001 (JP) ............................. 2001-251862

(51) Int. Cl.
*B41J 2/01* (2006.01)

(52) U.S. Cl. ..................... 347/100; 347/95; 106/31.6

(58) Field of Classification Search ............. 347/100, 347/96, 95, 101; 106/31.13, 31.6, 31.27; 523/160
See application file for complete search history.

(56) References Cited

U.S. PATENT DOCUMENTS

| | | | |
|---|---|---|---|
| 5,221,334 A | 6/1993 | Ma et al. ................ | 106/20 D |
| 5,272,201 A | 12/1993 | Ma et al. ................ | 524/505 |
| 5,519,085 A | 5/1996 | Ma et al. ................ | 524/503 |
| 5,549,740 A * | 8/1996 | Takahashi et al. ....... | 347/100 |
| 5,640,187 A | 6/1997 | Kashiwazaki et al. .... | 347/101 |
| 5,696,182 A | 12/1997 | Kashiwazaki et al. .... | 523/161 |
| 5,852,075 A | 12/1998 | Held ....................... | 523/161 |
| 5,854,331 A | 12/1998 | Ma et al. ................ | 524/505 |
| 5,882,388 A | 3/1999 | Adair et al. ............. | 106/31.6 |
| 5,952,401 A | 9/1999 | Kimura et al. ........... | 523/161 |
| 5,958,999 A | 9/1999 | Bates et al. ............. | 523/161 |
| 6,030,440 A | 2/2000 | Sekioka et al. .......... | 106/31.65 |
| 6,117,921 A | 9/2000 | Ma et al. ................ | 523/161 |
| 6,153,000 A | 11/2000 | Erdtmann et al. ........ | 106/31.6 |
| 6,153,001 A | 11/2000 | Suzuki et al. ........... | 106/31.65 |
| 6,196,671 B1 * | 3/2001 | Breemes, Sr. et al. .... | 347/86 |
| 6,238,407 B1 | 5/2001 | Wolf et al. ............... | 606/185 |
| 6,247,798 B1 * | 6/2001 | Cleland et al. .......... | 347/65 |
| 6,391,947 B1 | 5/2002 | Noguchi et al. ......... | 524/84 |

(Continued)

FOREIGN PATENT DOCUMENTS

CN          1114969 A      1/1996

(Continued)

*Primary Examiner*—Manish S. Shah
(74) *Attorney, Agent, or Firm*—Fitzpatrick, Cella, Harper & Scinto (57) ABSTRACT

Provided is an ink set including a plurality of inks each of which contains a water-insoluble coloring material and enabling ink-jet record images to be stably formed. The ink set includes first to nth aqueous inks for ink-jet recording, each of the aqueous inks containing a water-insoluble coloring material, an aqueous medium and a dispersant for dispersing the pigment in the aqueous medium, and a water-soluble organic compound, wherein the first to the nth aqueous inks are different from each other in pigment concentration based on the total weight of the each ink; and the first to the nth aqueous inks have the same or substantially the same viscosity at an actual usage temperature (T1).

10 Claims, 3 Drawing Sheets

U.S. PATENT DOCUMENTS

| | | | |
|---|---|---|---|
| 6,478,862 B1 * | 11/2002 | Elwakil | 106/31.6 |
| 6,488,751 B1 * | 12/2002 | Takemoto | 106/31.13 |
| 2001/0001103 A1 * | 5/2001 | Noguchi et al. | 528/71 |
| 2002/0005884 A1 | 1/2002 | Onishi et al. | 347/100 |
| 2002/0038613 A1 * | 4/2002 | Yatake | 106/31.6 |
| 2003/0008938 A1 * | 1/2003 | Sano et al. | 523/160 |

FOREIGN PATENT DOCUMENTS

| | | |
|---|---|---|
| DE | 198 61 069 A1 | 11/1999 |
| EP | 1132441 A1 * | 9/2001 |
| JP | 60-197776 A | 10/1985 |
| JP | 5-179183 A | 7/1993 |
| JP | 6-136311 A | 5/1994 |
| JP | 7-53841 A | 2/1995 |
| JP | 10-87768 A | 4/1998 |
| JP | 11-43639 A | 2/1999 |
| JP | 11-236502 A | 8/1999 |
| JP | 11-269418 A | 10/1999 |
| WO | WO 01/48100 A1 | 12/2000 |

* cited by examiner

INK SET FOR INK-JET RECORDING, RECORDING UNIT, INK-JET RECORDING APPARATUS AND INK-JET RECORDING METHOD

BACKGROUND OF THE INVENTION

1. Field of the Invention

The present invention relates to an ink set for ink-jet recording, a recording unit, an ink-jet recording apparatus and an ink-jet recording method.

2. Related Art

The ink-jet recording method is a method of printing by flying and attaching droplets of an ink composition onto a recording medium such as paper. This method can print images of high-resolution and high-quality at a high speed using a relatively inexpensive apparatus.

In recent years, the ink-jet recording method has been applied to form color images using color inks. For example, multi-color images are formed with a set of three color inks of yellow, magenta and cyan; a four-color ink set with additional black ink; and further a six-color ink set containing two additional inks with the same magenta or cyan hue but with different in coloring power. Meanwhile, recently, inks containing water-insoluble coloring materials such as pigments have become in use according to increasing requirements for improved fastness such as light fastness of images formed by an ink-jet printer, especially by a large ink-jet printer such as a plotter.

SUMMARY OF THE INVENTION

Under the technical background described above, the present inventors studied the case where an ink jet printer is provided with two or more inks containing the same coloring material dispersed in an aqueous medium but in different concentrations and found that ink supply to the ink-jet head and suction/recovery action or the head became unstable in some cases. Studying the cause, the present inventors found that difference in ink properties, particularly viscosity difference, is a cause of the above unstable action of the ink-jet head. More specifically, for example, the suction/recovery action proceeds preferentially in the nozzle filled with the ink of a lower viscosity, resulting in insufficient recovery of the nozzle filled with the ink of a higher viscosity. Such a problem had not been recognized until the present inventors studied ink jet printing using a plurality of inks of different pigment concentrations. The present inventors found that, in order to increase commercial value of the ink-jet printer employing inks of four or six colors all of which contain water-insoluble coloring materials, images that are excellent in light fastness and weatherability need to be obtained.

Thus one object of the present invention is to provide an ink-set comprising a plurality of inks each containing a water-insoluble coloring material which would enable stable ink-jet recording. Another object of the present invention is to provide an ink-jet recording method to form durable ink-jet recorded images more stably. Still another object of the present invention is to provide an ink-tank, a recording unit and an ink-jet recording apparatus applicable to the above ink-jet recording method.

According to one aspect of the present invention, there is provided an ink set for ink jet recording comprising a first to n-th aqueous inks, each of the inks comprising a water-insoluble coloring material, an aqueous medium and a dispersant for dispersing the pigment in the aqueous medium, and a water-soluble organic compound, wherein the first to the n-th aqueous inks are different from each other in pigment concentration based on the total weight of the each ink; and the first to the n-th aqueous inks have the same or substantially the same viscosity at an actual usage temperature provided that the number n is an integer not less than 2.

According to another aspect of the present invention, there is provided an ink jet recording method comprising the steps of
(i) providing the above described ink set; and
(ii) discharging each of the first to n-th aqueous inks by ink-jet method.

According to another aspect of the present invention, there is provided an ink cartridge comprising a plurality of ink tanks. Each of the ink tanks contains the first to n-th inks for ink-jet recording constituting the above-described ink set, respectively.

According to a further aspect of the present invention, there is provided a recording unit comprising a plurality of ink tanks in each of which a first to n-th aqueous inks for ink-jet recording constituting the above-described ink set is contained, respectively; and a plurality of ink-jet recording heads for discharging each of the inks contained in the respective ink tanks.

According to a still further aspect of the present invention, there is provided an apparatus comprising a plurality of ink tanks each of which containing a first to nth aqueous inks for ink-jet recording constituting the above-described ink set, respectively; and a plurality of ink-jet recording heads for discharging each of the inks contained in the respective ink tanks.

DETAILED DESCRIPTION OF THE INVENTION

One feature of the ink set of the present invention is that an ink set is comprised of the first to n-th aqueous ink jet inks (n is an integer of 2 or more), each of the inks comprises a water-insoluble coloring material, an aqueous medium and a dispersant for dispersing the coloring material in the aqueous medium, and a water-soluble organic compound, where the first to the n-th aqueous inks are different from each other in the concentration of the coloring material based on the total weight of the each ink; and the first to the n-th aqueous inks have the same or substantially the same viscosity at the actual usage temperature.

Here, the feature that the first to the n-th aqueous inks have the same or substantially the same viscosity at the actual usage temperature means that the viscosity of each ink falls in the range of $\eta_{ave} \pm 15\%$ where $\eta_{ave}$ is the average viscosity of the inks at the actual usage temperature (T1), usually in the range of 10 to 50° C.

Preferably, the viscosity of each ink at T1 is in the range of $\eta_{ave} \pm 13\%$, more preferably, $\eta_{ave} \pm 10\%$. That the viscosity of each ink is in the range of ηave±15% means that the viscosity of the inks falls within the range of (1±0.15)×ηave, i.e., between 0.85×ηave to 1.15×ηave.

By satisfying these conditions, the above-mentioned problem caused by the difference of the ink viscosity can be alleviated or prevented. Although the value ηave varies depending on the temperature and the types of the ink-jet recording head, it is suitably in the range of about 2.0 mPa·s to 3.5 mPa·s at 25° C., for example. Suitable ηave at an actual usage temperature of 10 to 50° C. is in the range of about 1.5 mPa·s to 10 mPa·s.

When Pmax/Pmin, the ratio of the highest coloring material concentration of the inks (Pmax) to the lowest ink viscosity (Pmin) of the inks of the ink set, is 3 or more, further 3.5 or more, still further 4 or more, ink viscosity tends to differ between inks. Therefore the technical idea of the present invention to make the viscosity of the inks uniform or similar is particularly effective in such a case. Although the upper limit of Pmax/Pmin is not particularly defined in the present invention, it is not realistic for the pigment concentration of the inks to be used in one ink jet printer to vary in an extremely wide range in view of image quality, especially half tone reproduction, non-granular image, and image density. Accordingly, the highest Pmax/Pmin may be 20, particularly 15 and further particularly 10 or so.

To control the viscosity of inks having different concentrations of coloring materials, it is effective to use at least one material contained in the respective inks. More specifically, the following methods may be used:

(i) control with a water-soluble organic compound, for example, a water-soluble organic solvent; or (ii) control with the dispersant for the water-insoluble coloring material.

Particularly, the above method (ii) is preferable in the present invention because it would not affect ink permeability into the recording medium or the dispersibility of the coloring material in the ink.

The method (ii) is described more specifically by way of an example where a pigment is used as a coloring material.

When a pigment is dispersed in an aqueous medium, usually a resinous dispersant is added 0.5 to 1 times as much as the pigment by weight. This will cause different dispersant concentrations among the inks containing a pigment at different concentrations, resulting in difference in viscosity from one ink to another ink. By the above method (ii), the dispersant is added to an ink of a relatively low pigment concentration in an amount larger than the amount required to disperse the pigment, to make the viscosity of the ink the same or substantially the same as that of an ink of a relatively high pigment concentration.

(Smin/Smax)

In the meantime, it is preferred that inks contain the water-soluble organic compound in the same or substantially the same amount when the ink viscosity is adjusted by the above method (ii). Here, that the concentration of the water-soluble organic compound in the ink being the same or substantially the same between inks means that the ratio of the lowest concentration of the water-soluble organic compound (Smin) to the highest concentration of the water-soluble organic compound of the inks, Smin/Smax, is not less than 0.6, preferably not less than 0.7. As Smin/Smax is closer to 1, the variation of the concentration of the water-soluble compound is smaller, while as Smin/Smax is closer to 0, the concentration of the water-soluble compound varies more between inks. Variation of the storage stability or recording properties between the inks can be effectively suppressed by adjusting the concentration of the water-soluble organic compound to the same or substantially the same.

Specifically, the method (ii) can be carried out by adding a dispersant to ink. The dispersant may be added in an excessive amount in the step for preparing a pigment dispersion, or it may be added in the step where the dispersion is mixed with other ingredients. The dispersant may be of any type but it is preferably the same dispersant as that used to disperse the pigment.

(Dispersant)

As a dispersant in the present invention, any conventional water-soluble resin other than so-called resin emulsions can be used. Specific examples of the water-soluble resin include a block or random copolymer comprised of at least two monomers selected from styrene, styrene derivatives, vinyl-naphthalene derivatives, aliphatic alcohol esters of α,β-ethylenically unsaturated carboxylic acids, acrylic acid, acrylic acid derivatives, maleic acid, meleic acid derivatives, itaconic acid, itaconic acid derivatives, fumaric acid, fumaric acid derivatives, or the salts thereof. Examples of the polymer structure include a random copolymer, block copolymer, branched copolymer or graft copolymer. According to the above method (ii), the resinous dispersant should be present in the ink more than necessary for pigment dispersion. Thus it is preferable to select a resinous dispersant that would not affect or hardly affect the ejection of the ink even when it is contained in a significant amount in the ink. In this point, a block copolymer is particularly preferred, because it will affect ejection of the ink not al all or very slightly even when it is contained in a significant amount in the ink.

The advantage of use of block copolymer in improving the ejection stability is more prominent with a thermal ink jet recording head driven at a high frequency.

Examples of the block copolymer include AB-, BAB- and ABC-type copolymers, wherein A, B and C represent different polymer blocks, but not limited thereto as long as blocks are present. In the present invention, advantageously used is a block copolymer having hydrophobic and hydrophilic blocks in a well-balanced block size conducing to dispersion stability. Also the hydrophobic block to which the coloring material binds may contain a functional group to enhance the specific interaction between the dispersant and the coloring material thereby further improving the dispersion stability. Due to its reological properties, such a polymer is especially preferable to be used with an ink jet recording head utilizing thermal energy, particularly, in an ink jet recording head ejecting minute ink droplets.

The content of the polymer in the ink depends on the structure of the polymer, molecular weight and the other properties as well as the other ingredients in the ink composition. The number average molecular weight of the polymer to be selected for carrying out the present invention is less than 40,000, preferably less than 20,000, more preferably in a range of 2,000 to 10,000.

Methods for preparing these polymers are disclosed in Japanese Patent Application Laid-Open No. 05-179183, Japanese Patent Application Laid-Open No. 06-136311, Japanese Patent Application Laid-Open No. 07-053841, Japanese Patent Application Laid-Open No. 10-87768, Japanese Patent Application Laid-Open No. 11-043639, Japanese Patent Application Laid-Open No. 11-236502 and Japanese Patent Application Laid-Open No. 11-269418.

Non-limiting examples of typical hydrophobic polymers usable for the block copolymer include benzyl acrylate, benzyl methacrylate, methyl methacrylate (MMA), ethyl methacrylate (EMA), propyl methacrylate (PMA), n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, hydroxyethyl methacrylate (HEMA), hydroxypropyl methacrylate, 2-ethoxyethyl methacrylate, methacrylonitrile, 2-trimethylsiloxyethyl methacrylate, glycidyl methacrylate (GMA), p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, 2-phenylethyl methacrylate, hydroxyethyl acrylate, hydroxypropyl acrylate, acrylonitrile, 2-trimethylsiloxyethyl acrylate, glycidyl acrylate, p-tolyl acrylate, sorbyl acrylate, etc. Preferable hydrophobic polymers are benzyl acrylate, benzyl methacrylate, 2-phenylethyl methacrylate, methyl methacrylate, buthyl methacrylate and 2-ethylhexyl methacrylate, and homopolymers or copolymers produced from these monomers, for example, a block copolymer obtained from methyl methacrylate and butyl methacrylate can be preferably used to produce a block copolymer.

Non-limiting examples of typical hydrophyllic polymers usable for the block copolymer include methacrylic acid (MAA), acrylic acid, dimethylaminoethyl methacrylate (DMAEMA), diethylaminoethyl methacrylate, tert-butylaminoethyl methacrylate, dimethylaminoethyl acrylate, diethylaminoethyl acrylate, dimethylaminopropyl methacrylamide, methacrylamide, acrylamide, dimetyl acrylamide, etc. Homopolymers or copolymers produced from methacrylic acid, acrylic acid and dimethylaminoethyl methacrylate can be preferably used to produce a block copolymer.

Acid containing polymers can be produced directly or from blocked monomers having a blocking group to be removed after polymerization. Examples of blocked monomers which will give acrylic acid or methacrylic acid after deblocking include trimethylsilyl methacrylate (TMS-MAA), trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate and 2-tetrahydropyranyl methacrylate.

The preferred concentration of the dispersant in the ink is in a range of 0.4 weight % to 10 weight %, more preferably 0.6 weight % to 8 weight %, most preferably 0.8 weight % to 6 weight %.

(Pigment)

Pigments usable in the present invention will be described below.

An example of pigment usable for black ink of the pigment inks is preferably carbon black.

Examples of color pigments, indicated by color index (C.I.) number, include C.I. pigment yellow 12, 13, 14, 17, 20, 24, 55, 74, 83, 86, 93, 97, 98, 109, 110, 117, 120, 125, 128, 137, 138, 139, 147, 148, 150, 151, 153, 154, 155, 166, 168, 180, 185, C.I. pigment orange 16, 36, 43, 51, 55, 59, 61, 71, C.I. pigment red 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255, 272, C.I. pigment violet 19, 23, 29, 30, 37, 40, 50, C.I. pigment blue 15, 15:1, 15:3, 15:4, 15:6, 22, 60, 64, C.I. pigment green 7, 36, C.I. pigment brown 23, 25, 26 etc. Among these, C.I. pigment yellow 13, 17, 55, 74, 93, 97, 98, 110, 128, 138, 139, 147, 150, 151, 154, 155, 180, 185, C.I. pigment red 122, 202, 209, C.I. pigment blue 15:3, 15:4 are preferred.

Preferred pigment concentration in the ink is in a range of 0.1 weight % to 10 weight %, more preferably 0.3 weight % to 6 weight %.

The first to nth inks in the present invention may include inks of different color hue, or they may include inks having the same color hue but different coloring ability, that is, a combination(s) of dark ink and light ink. Actually, the most significant difference in pigment concentration between inks to be used for an ink jet printer may be observed in a group of light and dark inks, that is, inks of different pigment concentrations but of the same color hue. For example, inks having a low coloring ability (so-called light inks), which are frequently used for forming images of photographic quality to obscure ink jet dots or granular image, are often formulated to a pigment concentration in the range not more than 1 weight % based on the total weight of the ink. Usually the pigment concentration of a light ink is determined by considering the balance with the dark ink and is simply defined. However, the pigment concentration of a light ink is preferably set not more than 1 weight %, more preferably not more than 0.8 weight %, and most preferably not more than 0.6 weight %, since in the region formed with an ink having a pigment concentration of 1 weight % or more, the edge of each dot tends to be visually perceived giving a granular impression.

Furthermore, when the first to nth inks of the present invention include a set of dark and light inks of which viscosity is adjusted according to the above described method (ii), a further effect that the durability of ink-jet recorded images will be improved can be obtained. Usually, images formed with pigment inks are considered to have an excellent durability such as light fastness, anti-gas-fading and the like properties. Recent researches, however, have revealed that an image formed with a light pigment ink is inferior to one formed with a dark pigment ink in the durability. Unexpectedly, it was improved the durability of the image formed with a light ink containing a resinous dispersant to adjust the viscosity to the level of the dark ink according to the present invention. This means that increase in the ratio of the resinous dispersant to the pigment (i.e. Binder/Pigment ratio) in light inks contributes to the durability improvement of the images formed with light inks. Therefore, when the first to nth inks of the present invention include dark and light inks and the viscosity adjustment of the light inks are conducted by the above method (ii) in such a manner that the B/P ratio of the light ink is higher than that of the dark ink, ink-jet images having remarkably improved durability can be formed, in addition to the stable ink jet recording. Incidentally, WO01/48100 discloses a technique of changing the B/P ratio between dark and light inks, but nothing about the viscosity adjustment of the inks, which is the technical feature of the present invention. Also its examples do not give necessary information to specify the ink viscosity such as the dispersion method. Accordingly, WO01/48100 has no meaning to the present invention.

In the present invention, the dark and light inks are defined to give images of the same hue. Here, the same color hue image means that when images of 360 dpi (dot per inch)×720 dpi on plain paper are formed with the dense ink and the pale ink respectively using an ink jet recording head that ejects 20 to 50 pl droplets, and thus obtained images are visually observed and are classified into 10 Munsell categories (R, YR, Y, GY, G, BG, B, PB, P and RP) based on the Munsell color chart, and the images belong to the same category or adjacent categories. Water-soluble organic compound (Surfactant)

In the case of a head using heat energy, addition of a nonionic surfactant to the ink of the present invention improves discharging durability. Preferred nonionic surfactants are polyoxyethylene alkylether, polyoxyethylene alkylphenylether, polyoxyethylene aliphatic acid ester, sorbitan aliphatic acid ester, polyoxyethylene sorbitan aliphatic acid ester, ethylene oxide adduct of acetylene glycol, etc. HLB thereof is not less than 10, preferably not less than 12, more preferably not less than 15. These surfactants may be used in an amount of 0.3 to 3 weight % in the ink. They are preferably used in an amount of 0.5 to 2.5 weight %, more preferably 0.8 to 2.0 weight %.

(Water-soluble Organic Solvent)

Specific examples of water-soluble organic solvents usable in the present invention include alkyl alcohols having 1 to 5 carbon atoms such as methyl alcohol, ethyl alcohol, n-propyl alcohol, isopropyl alcohol, n-butyl alcohol, sec-butyl alcohol and tert-butyl alcohol, isobutyl alcohol and n-pentanol; amides such as dimethylformamide and dimethylacetamide; ketones or ketoalcohols such as acetone and diacetone alocohol; ethers such as tetrahydrofuran and dioxane; polymers (dimer, trimer, tetramer, etc.) of oxyethylene or oxypropylene such as diethylene glycol, triethylene glycol, tetraethylene glycol, dipropylene glycol, tripropylene glycol, polyethylene glycol and polypropylene glycol; alkylene glycols in which alkylene group includes 2 to 6 carbon atoms, such as ethylene glycol, propylene glycol, trimethylene glycol, 1,2,6-hexane triol; glycerol; lower alkyl ether of polyhydric alcohols, such as ethylene glycol monomethyl (or ethyl) ether, diethylene glycol monomethyl (or ethyl) ether and triethylene glycol monomethyl (or ethyl) ether; lower dialkyl ether of polyhydric alcohols, such as triethylene glycol dimethyl (or ethyl) ether and tetraethylene glycol dimethyl (or ethyl) ether; alkanol amines such as monoethanol amine, diethanol amine and triethanol amine; sulfolane, N-methyl-2-pyrrolidone, 2-pyrrolidone and 1,3-dimethyl-2-imidazoridinone, etc.

Among these solvents, ethylene glycol, diethylene glycol, triethylene glycol, 2-pyrrolidone, glycerol and 1,2,6-hexane triol can be particularly preferably used.

Content of the above described water-soluble organic solvent is not limited but preferably in a range of 3 to 50 weight %, more preferably of 10 to 35 weight % to total weight of the ink. Water content in the ink is preferably in a range of 50 to 95 weight % to total weight of the ink.

Furthermore, urea, ethylene urea and trimethylolpropane can be preferably used as a humectant. Particularly, ethylene urea and trimethylolpropane are very suitable for the present invention. These are preferably used in an amount of 1 to 20 weight %.

(Ink-jet Recording Method, Apparatus for the Method, etc.)

The ink-jet recording method of the present invention comprises the steps of:

(i) preparing an ink set of inks described above; and (ii) discharging respective inks by an ink-jet recording system.

Figure 1:
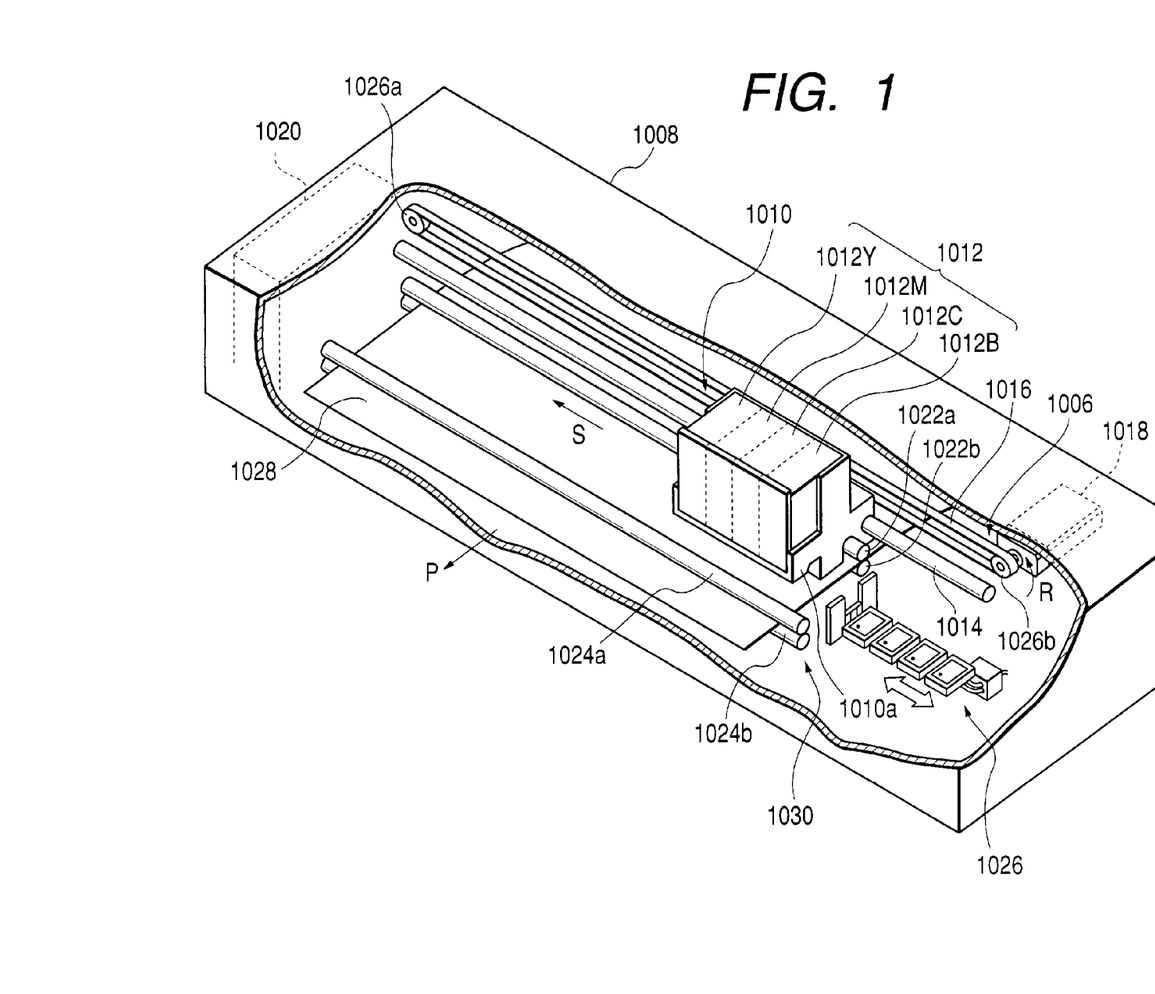
FIG. 1 is a schematic perspective view illustrating the main part of an ink-jet printer on which a liquid discharging head can be mounted.

An ink-jet recording apparatus of the present invention usable in the above method will be illustrated with regard to an ink-jet printer as a specific example. FIG. 1 is a schematic perspective view of a liquid discharging head for use in discharging system in which a bubble is communicated with the atmosphere when discharging action is conducted and a main part of an ink-jet printer as a liquid discharging apparatus using this head.

In FIG. 1, the ink jet printer is configured to comprise a feeder device 1030 that intermittently feeds a sheet of paper 1028 as a recording medium provided along the longitudinal direction in a casing 1008 in the direction shown by arrow P shown in FIG. 1, a recording section 1010 that is reciprocated approximately in parallel to the direction S approximately at right angles to the feeding direction P of the paper 1028 by the feeder device 1030, and a movement driving section 1006 as driving means for reciprocating the recording section 1010.

The feeder device 1030 comprises a roller unit 1022a and 1022b and a roller unit 1024a and 1024b are allocated approximately in parallel, and a driving portion 1020 for driving these roller units. With such a constitution, when the driving portion 1020 of the feeder device 1030 is operated, the paper 1028 is conveyed intermittently in the direction P, nipped between the roller units 1022a and 1022b, and 1024a and 1024b.

The movement driving section 1006 is configured to comprise a belt 1016 that is wound on pulleys 1026a, 1026b provided on rotary shafts oppositely arranged with a predetermined interval, and a motor 1018 that drives the belt 1016 arranged approximately in parallel to roller units 1022a, 1022b and connected to a carriage member 1010a of the recording section 1010 in the forward direction and reverse direction.

When the motor 1018 is brought in the operating state and the belt 1016 is rotated in the direction shown by arrow R, the carriage member 1010a of the recording section 1010 is moved in the direction shown by arrow S only by a predetermined movement. Furthermore, when the motor 1018 is brought in the operating state and the belt 1016 is rotated in the direction opposite to the direction shown by arrow R, the carriage member 1010a of the recording section 1010 is moved in the direction opposite to the direction shown by arrow S only by a predetermined movement. Furthermore, to one end of the movement driving section 1006, at a position which is a home position of the carriage member 1010a, a recovery unit 1026 for performing the ejection recovery process of the recording section 1010 is provided opposite to the arrangement of the ink ejection orifice of the recording section 1010.

In the recording section 1010, ink jet cartridges (hereafter, in some cases, referred to simply as cartridges) 1012Y, 1012M, 1012C, 1012 B are detachably provided to the carriage member 1010a for each color, for example, for each of yellow, magenta, cyan, and black.

Figure 3:
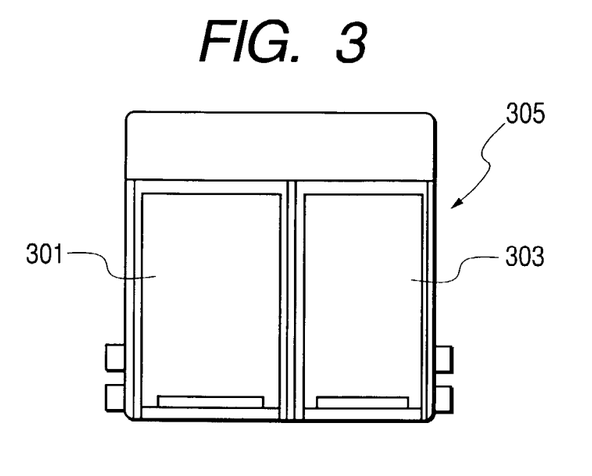
FIG. 3 is a schematic view illustrating one embodiment of an ink-jet cartridge of the present invention.
Figure 4:
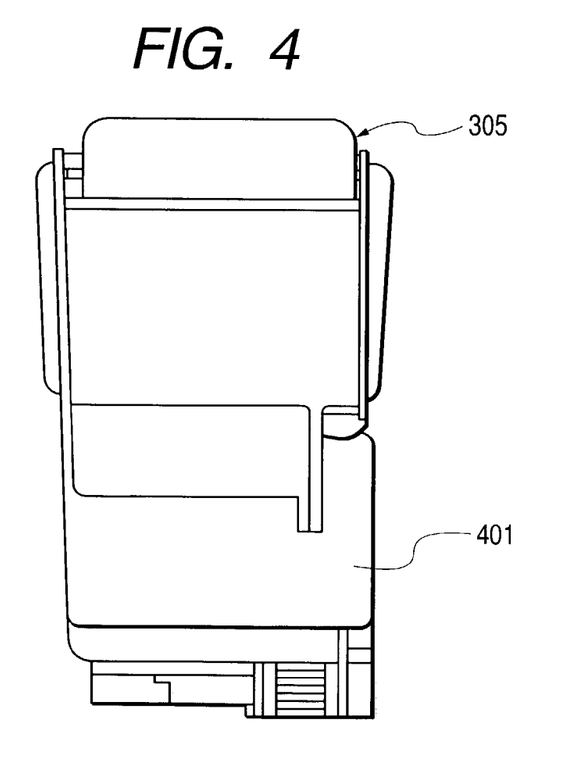
FIG. 4 is a schematic view illustrating one embodiment of a recording unit of the present invention.

In the above-described configuration, the 1-nth inks are contained in different cartridges, but, inks may be contained in an ink cartridge 305 having ink-containers 301 and 303 as shown in FIG. 3 to contain the first and second inks of the invention, and the cartridge is detachably mounted on an ink jet recording head 401 as shown in FIG. 4. When the ink cartridges shown in FIG. 3 is mounted on the ink jet recording head 401 as shown in FIG. 4, the first and second inks of the present invention are fed to the recording head and are discharged therefrom. FIGS. 3 and 4 illustrate a configuration in which the ink cartridge is detachably mounted on the ink jet recording head, but it is also possible a configuration in which the ink cartridge and the ink jet recording head are integrally constructed.

Figure 2:
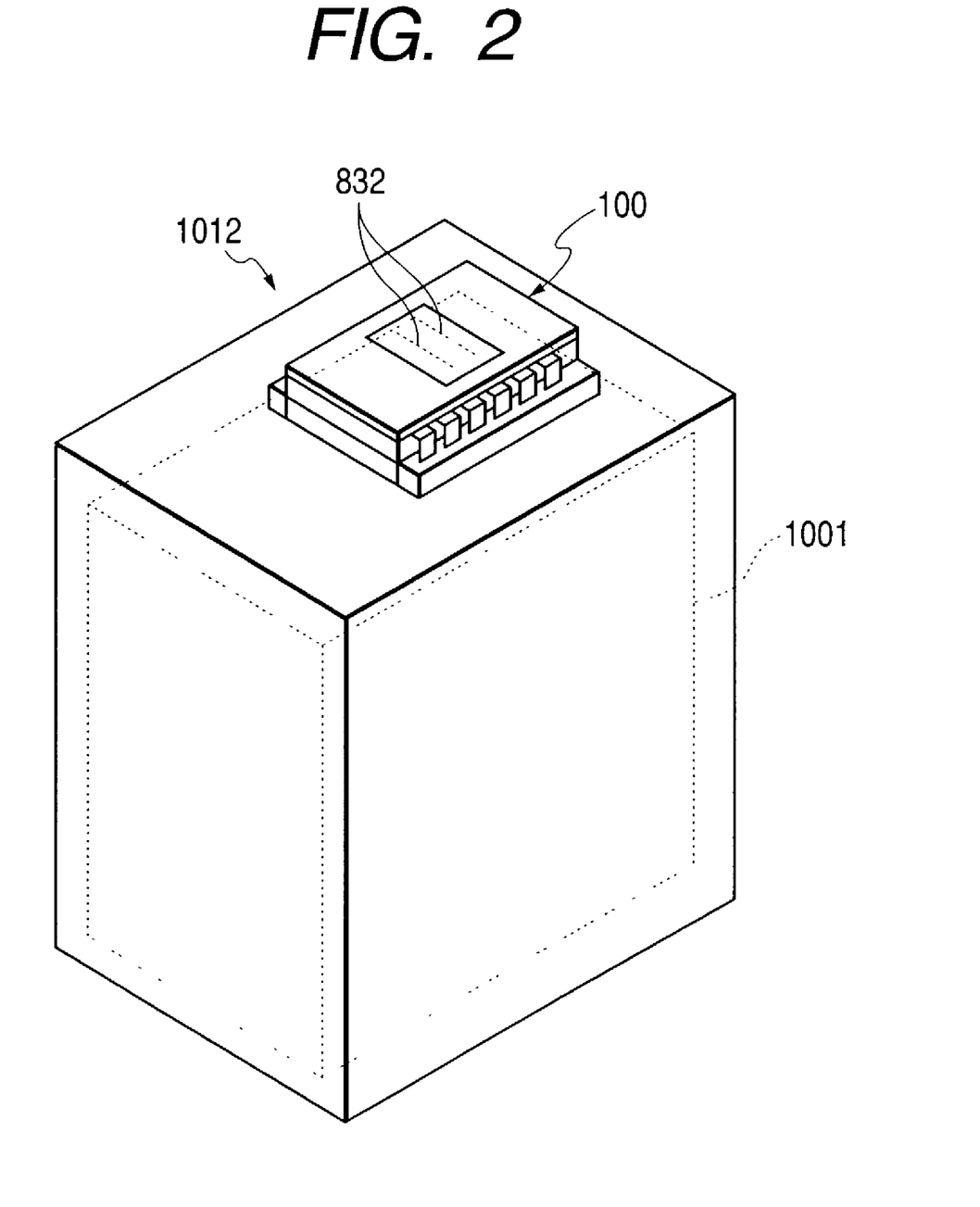
FIG. 2 is a schematic perspective view illustrating one example of an ink-jet cartridge provided with a liquid discharging head.

FIG. 2 shows an example of the ink jet cartridge mountable on the above-described ink jet recording apparatus. The cartridge 1012 in the present embodiment is of a serial type, of which main part is comprised of an ink jet recording head 100 and a liquid tank 1001 for containing a liquid such as ink.

The ink jet recording head 100 is provided with a plurality of discharge ports 832 for discharging a liquid, and such a liquid, or ink, is introduced from the liquid tank 1001 to a common liquid chamber (not shown) of the liquid discharge head 100 through a liquid supply path (not shown). The cartridge 1012 shown in FIG. 2 is integrally composed of the ink jet recording head 100 and the liquid tank 1001 in which liquid is replenished whenever necessary, but there may also be adopted a configuration in which the liquid tank 1001 is interchangeably connected to the liquid discharge head 100.

A recording unit is an ink jet cartridge provided with an ink jet recording head. Thus, the constitution of FIG. 4 where the ink cartridge is mounted on in ink jet recording head is in the scope of the recording unit of the present invention.

EXAMPLES

The present invention will be described in more detail by way of the following Examples and Comparative Examples.

First, inks of the ink set of the invention to be used in Example 1, i.e., yellow ink 1, magenta ink 1, cyan ink 1, black ink 1, light magenta ink and light cyan ink, were prepared as follows.

(Yellow Ink 1 (Y1))

(1) Dispersion Preparation

First, a block polymer of AB type having an acid value of 300 and a number average molecular weight of 2500 was prepared from benzyl acrylate and methacrylic acid by a conventional method. The polymer was neutralized with a KOH aqueous solution and diluted with ion-exchanged water to form a homogeneous solution of a 50 weight % polymer content.

To 140 g of the above described polymer solution, 100 g of C.I. Pigment Yellow 138 and 260 g of ion-exchanged water were added and premixed for 30 minutes. Then the mixture was subjected to a microfluidizer treatment by passing the mixture through an L-type ceramic chamber under a liquid pressure of about 10,000 psi (about 70 MPa) five times.

Then the resulted dispersion was centrifuged (12,000 rpm, 20 minutes) to remove the non-dispersed matters including coarse particles to obtain a yellow dispersion. The pigment concentration and the dispersant concentration of the obtained yellow dispersion were 10 weight % and 7.5 weight % respectively.

(2) Preparation of Ink (Y1)

To the above yellow dispersion, the following components were added as shown below, fully mixed and stirred. The mixture was filtrated under pressure through a microfilter having a pore size of 2.5 µm (manufatured by Fuji Photo Film Co., Ltd.) to prepare a pigment ink of which pigment concentration was 4.5 weight % and dispersant concentration was 3.38 weight %.

| Yellow dispersion | 45 parts |
| Glycerol | 10 parts |
| Diethylene glycol | 10 parts |
| Ethylene oxide adduct of acetylene glycol (Acetylenol EH manufactured by Kawaken Fine Chemicals Co., Ltd.) | 0.5 parts |
| Ion-exchange water | 34.5 parts |

(Magenta Ink 1 (M1))

(1) Preparation of Dispersion

To 100 g of the polymer solution used in the yellow ink 1, 100 g of C.I. Pigment Red 122 and 300 g of ion-exchanged water were added and premixed for 30 minutes. Then the mixture was subjected to a microfluidizer treatment by passing the mixture through an L-type ceramic chamber under a liquid pressure of about 10,000 psi (about 70 MPa) five times.

Then the resulted dispersion was centrifuged (12,000 rpm, 20 minutes) to remove the non-dispersed matters including coarse particles to obtain a magenta dispersion. The pigment concentration and the dispersant concentration of the obtained magenta dispersion were 10 weight % and 5 weight % respectively.

(2) Preparation of Ink (M1)

To the above magenta dispersion, the following components were added as shown below, fully mixed and stirred. The mixture was filtrated under pressure through a microfilter having a pore size of 2.5 µm (manufactured by Fuji Photo Film Co., Ltd.) to prepare a pigment ink of which pigment concentration was 4 weight % and dispersant concentration was 2 weight %.

| Magenta dispersion | 40 parts |
| Glycerol | 10 parts |
| Diethylene glycol | 10 parts |
| Acetylenol EH manufactured by Kawaken Fine Chemicals Co., Ltd. | 0.5 parts |
| Ion exchange water | 39.5 parts |

(Cyan Ink 1 (C1))

(1) Preparation of Dispersion

First, an AB-type block polymer having an acid value of 250 and a number average molecular weight of 3000 is prepared from benzyl acrylate and methacrylic acid by a conventional method, which was neutralized with an aqueous KOH solution and diluted with ion-exchanged water to form a homogeneous solution of 50 weight % polymer.

To 180 g of the above described polymer solution, 100 g of C.I. Pigment Blue 15:3 and 220 g of ion-exchanged water were added and premixed for 30 minutes. Then the mixture was subjected to a microfluidizer treatment by passing the mixture through an L-type ceramic chamber under a liquid pressure of about 10,000 psi (about 70 MPa) five times.

Then the resulted dispersion was centrifuged (12,000 rpm, 20 minutes) to remove the non-dispersed matters including coarse particles to obtain a cyan dispersion. The pigment concentration and the dispersant concentration of the obtained cyan dispersion were 10 weight % and 10 weight % respectively.

(2) Preparation of Ink (C1)

To the above cyan dispersion, the following components were added as shown below, fully mixed and stirred. The mixture was filtrated under pressure through a microfilter having a pore size of 2.5 µm (manufactured by Fuji Photo Film Co., Ltd.) to prepare a pigment ink of which pigment concentration was 2 weight % and dispersant concentration was 2 weight %. dispersant.

| Cyan dispersion | 20 parts |
|---|---|
| Glycerol | 10 parts |
| Diethylene glycol | 10 parts |
| Ethylene glycol | 6 parts |
| Acetylenol EH manufactured by Kawaken Fine Chemicals Co., Ltd.) | 0.5 parts |
| Ion-exchange water | 53.5 parts |

(Black Ink 1 (Bk1))

(1) Preparation of Dispersion

To 100 g of the polymer solution used in the yellow ink 1, 100 g of carbon black and 300 g of ion-exchanged water were added and premixed for 30 minutes. Then the mixture was subjected to a microfluidizer by passing the mixture through an L-type ceramic chamber under a liquid pressure of about 10,000 psi (about 70 MPa) five times.

Then the resulted dispersion was centrifuged (12,000 rpm, 20 minutes) to remove the non-dispersed matters including coarse particles to obtain a black dispersion. The pigment concentration and the dispersant concentration of the obtained black dispersion were 10 weight % and 6 weight % respectively.

(2) Preparation of Ink (BK1)

To the above black dispersion, the following components were added as shown below, fully mixed and stirred. The mixture was filtrated under pressure through a microfilter having a pore size of 2.5 μm (manufactured by Fuji Photo Film Co., Ltd.) to prepare a pigment ink of which pigment concentration was 5 weight % and dispersant concentration was 3 weight %.

| Black dispersion | 50 parts |
|---|---|
| Glycerol | 10 parts |
| Triethylene glycol | 10 parts |
| Trimethylolpropane | 4 parts |
| Acetylenol EH | 0.5 parts |
| Ion exchange water | 25.5 parts |

(Light Magenta Ink 1 (LM1))

(1) Preparation of Dispersion

To 450 g of the polymer solution used in the yellow ink 1, 100 g of C.I. Pigment Red 122 and 450 g of ion-exchanged water were added and premixed for 30 minutes. Then the mixture was subjected to a microfluidizer by passing the mixture through an L-type ceramic chamber under a liquid pressure of about 10,000 psi (about 70 MPa) five times.

Then the resulted dispersion was centrifuged (12,000 rpm, 20 minutes) to remove the non-dispersed matters including coarse particles to obtain a magenta dispersion 2. The pigment concentration and the dispersant concentration of the obtained magenta dispersion 2 were 5 weight % and 12 weight % respectively.

(2) Preparation of Ink (LM1)

To the above magenta dispersion 2, the following components were added as shown below, fully mixed and stirred. The mixture was filtrated under pressure through a microfilter having a pore size of 2.5 μm (manufactured by Fuji Photo Film Co., Ltd.) to prepare a pigment ink of which pigment concentration was 0.9 weight % and dispersant concentration was 2.16 weight %.

| Magenta dispersion 2 | 18 parts |
|---|---|
| Glycerol | 13 parts |
| Triethylene glycol | 7 parts |
| 2-Pyrrolidone | 3 parts |
| Acetylenol EH | 0.5 parts |
| Ion exchange water | 58.5 parts |

(Light Cyan Ink 1 (LC1))

(1) Preparation of Ink (LC1)

To the cyan dispersion used for Cyan Ink 1, the following components were added as shown below, fully mixed and stirred. The mixture was filtrated under pressure through a microfilter having a pore size of 2.5 μm (manufactured by Fuji Photo Film Co., Ltd.) to prepare a pigment ink of which pigment concentration was 0.6 weight % and dispersant concentration was 1.8 weight %.

| Cyan dispersion used in cyan ink 1 | 6 parts |
|---|---|
| Polymer solution used in cyan ink 1 | 2.4 parts |
| Glycerol | 12 parts |
| Diethylene glycol | 8 parts |
| Ethylene glycol | 8 parts |
| Acetylenol EH | 0.5 parts |
| Ion exchange water | 63.1 parts |

Next, yellow ink 2, magenta ink 2, cyan ink 2, cyan ink 3, light cyan ink 2, cyan ink 4, black ink 2, light magenta ink 2, light cyan ink 3, light magenta ink 3, and light cyan ink 4 to be used in Examples and Comparative Examples were prepared as follows.

(Yellow Ink 2 (Y2))

(1) Preparation of Yellow Dispersion

| Styrene-acrylic acid copolymer (number average molecular weight: about 4000; random polymer) | 8 parts |
|---|---|
| Potassium hydroxide | 1 parts |
| Glycerol | 5 parts |
| Ion exchange water | 66 parts |

First, the above ingredients were mixed in a vessel, heated in a water bath to 70° C. to completely dissolve the resin ingredient. Then, 20 parts of C.I. Pigment Yellow 128 are added to this solution and premixed for 30 minutes, the resulted mixture was placed in a batch-type sandmill (manufactured by Aimex Co., Ltd.) filled with glass beads of 1 mm diameter as media, and dispersion treatment was conducted over 3 hours with water cooling.

Then the resulted dispersion was centrifuged (12,000 rpm, 20 minutes) to remove the non-dispersed matters including coarse particles to obtain an yellow dispersion. The pigment concentration and the dispersant concentration of the obtained yellow dispersion were 10 weight % and 4 weight % respectively.

(2) Preparation of Ink (Y2)

To the above yellow dispersion, the following components were added as shown below, fully mixed and stirred. The mixture was filtrated under pressure through a microfilter having a pore size of 2.5 μm (manufactured by Fuji Photo Film Co., Ltd.) to prepare a pigment ink of which pigment concentration was 3 weight % and dispersant concentration was 1.2 weight %.

| | |
|---|---|
| Above yellow dispersion | 30 parts |
| Glycerol | 6.5 parts |
| Ethylene urea | 8 parts |
| Ethylene oxide adduct of acetylene glycol (Product name: Surfynol 465 manufactured by Nisshin Chemicals Co., Ltd.) | 0.2 parts |
| Ion exchange water | 55.3 parts |

(Magenta Ink 2 (M2))

(1) Preparation of Magenta Dispersion

| | |
|---|---|
| Styrene-acrylic acid copolymer (number average molecular weight: about 2500; random polymer) | 11 parts |
| Potassium hydroxide | 1 parts |
| Diethylene glycol | 5 parts |
| Ion exchange water | 63 parts |

First, the above ingredients were mixed in a vessel, and heated in a water bath to 70° C. to completely dissolve the resin ingredient. Then, 20 parts of C.I. Pigment Red 122 were added to this solution and premixed for 30 minutes, the resulted mixture was subjected to a dispersion treatment as described in the preparation of the yellow dispersion for yellow ink 2. The obtained magenta dispersion contains 10 weight % pigment and 5.5 weight % dispersant.

(2) Preparation of Ink (M2)

To the above magenta dispersion, the following components were added as shown below, fully mixed and stirred. The mixture was filtrated under pressure through a microfilter having a pore size of 2.5 μm (manufactured by Fuji Photo Film Co., Ltd.) to prepare a pigment ink of which pigment concentration was 10 weight % and dispersant concentration was 5.5 weight %.

| | |
|---|---|
| Above magenta dispersion | 20 parts |
| Glycerol | 12 parts |
| Diethylene glycol | 5 parts |
| Ethylene urea | 8 parts |
| Acetylenol EH | 0.5 parts |
| Ion exchange water | 54.5 parts |

(Cyan Ink 2 (C2))

(1) Preparation of Cyan Dispersion

| | |
|---|---|
| Styrene-acrylic acid copolymer (number average molecular weight: about 4000; random polymer) | 13.5 parts |
| Potassium hydroxide | 1 parts |
| Diethylene glycol | 5 parts |
| Ion exchange water | 70.5 parts |

First, the above ingredients were mixed in a vessel, and heated in a water bath to 70° C. to completely dissolve the resin ingredient. Then, 10 parts of C.I. Pigment Blue 15:3 are added to this solution and premixed for 30 minutes, the resulted mixture was subjected to a dispersion treatment as described in the preparation of the yellow dispersion. The obtained cyan dispersion contains 5 weight % of pigment and 6.8 weight % of dispersant.

(2) Preparation of Ink (C2)

To the above cyan dispersion, the following components were added as shown below, fully mixed and stirred. The mixture was filtrated under pressure through a microfilter having a pore size of 2.5 μm (manufactured by Fuji Photo Film Co., Ltd.) to prepare a pigment ink of which pigment concentration was 0.95 weight % and dispersant concentration was 1.29 weight %.

| | |
|---|---|
| Above cyan dispersion | 19 parts |
| Glycerol | 10 parts |
| Diethylene glycol | 4 parts |
| Trimethylolpropane | 3 parts |
| Surfynol 440 | 0.1 parts |
| Ion exchange water | 63.9 parts |

(Cyan Ink 3 (C3))

(1) Preparation of Dispersion

First, an ABC-type block polymer having an acid value of 350 and a number average molecular weight of 2500 was prepared from benzyl acrylate, methacrylic acid and ethoxyethylene glycol by a conventional method. The polymer was neutralized with an aqueous solution of potassium hydroxide and diluted with ion-exchanged water to form a homogeneous solution of 50 weight % polymer. To 250 g of the above described polymer solution, 100 g of Pigment Blue 15:3 and 150 g of ion-exchanged water were added and premixed for 30 minutes. Then the mixture was subjected to a microfluidizer treatment by passing the mixture through an L-type ceramic chamber under a liquid pressure of about 10,000 psi (about 700 kg/cm$^2$) five times. Then the resulted dispersion was centrifuged (12,000 rpm, 20 minutes) to remove the non-dispersed matters including coarse particles to obtain a cyan dispersion. The pigment concentration and the dispersant concentration of the obtained Cyan dispersion were 10 weight % and 14 weight % respectively.

(2) Preparation of Ink (C4)

To the above cyan dispersion, the following components were added as shown below, fully mixed and stirred. The mixture was filtrated under pressure through a microfilter having a pore size of 2.5 μm (manufactured by Fuji Photo Film Co., Ltd.) to prepare a pigment ink of which pigment concentration was 1.8 weight % and dispersant concentration was 2.52 weight %.

| | |
|---|---|
| Above cyan dispersion | 18 parts |
| Glycerol | 10 parts |
| Triethylene glycol | 5 parts |
| Ethylene urea | 10 parts |
| Polyoxyethylene behenylether (EO 15) | 0.5 parts |
| Acetylenol EH | 0.5 parts |
| Ion-exchange water | 56 parts |

(Light Cyan Ink 2 (LC2))

(1) Preparation of Dispersion

To 550 g of the polymer solution used in cyan ink 3, 100 g of C.I. Pigment Blue 15:4 and 350 g of ion-exchanged water were mixed and premixed for 30 minutes. Then the mixture was subjected to a microfluidizer treatment by passing the mixture through an L-type ceramic chamber under a liquid pressure of about 10,000 psi (about 70 kg/cm$^2$) five times. Then the resulted dispersion was centrifuged (12,000 rpm, 20 minutes) to remove the non-dispersed matters including coarse particles to obtain a cyan dispersion. The pigment concentration and the dispersant concentration of the obtained cyan dispersion were 5 weight % and 15 weight % respectively.

(2) Preparation of Ink (LC2)

To the above cyan dispersion, the following components were added as shown below, fully mixed and stirred. The mixture was filtrated under pressure through a microfilter having a pore size of 2.5 µm (manufactured by Fuji Photo Film Co., Ltd.) to prepare a pigment ink of which pigment concentration was 0.3 weight % and dispersant concentration was 3 weight %.

| | |
|---|---|
| Above cyan dispersion | 6 parts |
| Polymer solution used for cyan ink 3 | 4.2 parts |
| Glycerol | 10 parts |
| Triethylene glycol | 5 parts |
| Ethylene urea | 10 parts |
| Polyoxyethylene behenylether (EO 15) | 0.5 parts |
| Acetylenol EH | 0.5 parts |
| Ion-exchange water | 63.8 parts |

(Cyan Ink 4 (C4))

Preparation of Ink

To the cyan dispersion used for preparation of cyan ink 1, the following components were added as shown below, fully mixed and stirred. The mixture was filtrated under pressure through a microfilter having a pore size of 2.5 µm (manufactured by Fuji Photo Film Co., Ltd.) to prepare a pigment ink of which pigment concentration was 2 weight % and dispersant concentration was 2 weight %.

| | |
|---|---|
| Cyan dispersion used in cyan ink 1 | 20 parts |
| Glycerol | 10 parts |
| Diethylene glycol | 10 parts |
| Acetylenol EH | 0.5 parts |
| Ion-exchange water | 59.5 parts |

(Black Ink 2 (BK2))

Preparation of Ink

To the black dispersion used for preparation of black ink 1, the following components were added as shown below, fully mixed and stirred. The mixture was filtrated under pressure through a microfilter having a pore size of 2.5 µm (manufactured by Fuji Photo Film Co., Ltd.) to prepare a pigment ink of which pigment concentration was 5 weight % and dispersant concentration was 3 weight %.

| | |
|---|---|
| Black dispersion used in black ink 1 | 50 parts |
| Glycerol | 10 parts |
| Triethylene glycol | 10 parts |
| Acetylenol EH | 0.5 parts |
| Ion-exchange water | 29.5 parts |

(Light Magenta Ink 2 (LM2))

Preparation of Ink

To the magenta dispersion used for preparation of magenta ink 1, the following components were added as shown below, fully mixed and stirred. The mixture was filtrated under pressure through a microfilter having a pore size of 2.5 µm (manufactured by Fuji Photo Film Co., Ltd.) to prepare a pigment ink of which pigment concentration was 0.9 weight % and dispersant concentration was 0.45 weight %.

| | |
|---|---|
| Magenta dispersion used in magenta ink 1 | 9 parts |
| Glycerol | 13 parts |
| Triethylene glycol | 7 parts |
| Acetylenol EH | 0.5 parts |
| Ion-exchange water | 70.5 parts |

(Light Cyan Ink 3 (LC3))

Preparation of Ink

To the cyan dispersion used for preparation of cyan ink 1, the following components were added as shown below, fully mixed and stirred. The mixture was filtrated under pressure through a microfilter having a pore size of 2.5 µm (manufactured by Fuji Photo Film Co., Ltd.) to prepare a pigment ink of which pigment concentration was 0.6 weight % and dispersant concentration was 0.6 weight %.

| | |
|---|---|
| Cyan dispersion used in cyan ink 1 | 6 parts |
| Glycerol | 12 parts |
| Diethylene glycol | 8 parts |
| Acetylenol EH | 0.5 parts |
| Ion-exchange water | 73.5 parts |

(Light Magenta Ink 3 (LM3))

Preparation of Ink

To the magenta dispersion used for preparation of magenta ink 1, the following components were added as shown below, fully mixed and stirred. The mixture was filtrated under pressure through a microfilter having a pore size of 2.5 µm (manufactured by Fuji Photo Film Co., Ltd.) to prepare a pigment ink of which pigment concentration was 0.9 weight % and dispersant concentration was 0.45 weight %.

| | |
|---|---|
| Magenta dispersion used in magenta ink 1 | 9 parts |
| Glycerol | 13 parts |
| Triethylene glycol | 7 parts |
| 2-Pyrrolidone | 3 parts |
| Dimethylene glycol | 8 parts |
| Trimethylolpropane | 5 parts |
| Acetylenol EH | 0.5 parts |
| Ion-exchange water | 54.5 parts |

(Light Cyan Ink 4 (LC4))

Preparation of Ink

To the cyan dispersion used for preparation of cyan ink 1, the following components were added as shown below, fully mixed and stirred. The mixture was filtrated under pressure through a microfilter having a pore size of 2.5 µm (manufactured by Fuji Photo Film Co., Ltd.) to prepare a pigment ink of which pigment concentration was 0.6 weight % and dispersant concentration was 0.6 weight %.

| | |
|---|---|
| Cyan dispersion used in cyan ink 1 | 6 parts |
| Glycerol | 18 parts |
| Diethylene glycol | 16 parts |
| Acetylenol EH | 0.5 parts |
| Ion-exchange water | 59.5 parts |

The composition and properties of inks constituting the ink sets of the Examples and Comparative Examples are shown in Table 1.

TABLE 1

| | | Example 1 | | | | | Example 2 | | | | Example 3 | | | Comparative Example 1 | | | | | | Example 4 | | | | |
|---|---|---|---|---|---|---|---|---|---|---|---|---|---|---|---|---|---|---|---|---|---|---|---|---|
| | | M1 | LM1 | C1 | LC1 | BK1 | Y1 | M2 | C2 | Y2 | C3 | LC2 | M1 | LM2 | C4 | LC3 | BK2 | Y1 | M1 | LM3 | C4 | LC4 | BK2 | Y1 |
| | Pigment | 4 | 0.9 | 2 | 0.6 | 5 | 4.5 | 2 | 0.95 | 3 | 1.8 | 0.3 | 4 | 0.9 | 2 | 0.6 | 5 | 4.5 | 4 | 0.9 | 2 | 0.6 | 5 | 4.5 |
| | Dispersant (block or Random) | 2 | 2.16 | 2 | 1.8 | 3 | 3.38 | 1.1 | 1.29 | 1.2 | 2.52 | 3 | 2 | 0.45 | 2 | 0.6 | 3 | 3.38 | 2 | 0.45 | 2 | 0.6 | 3 | 3.38 |
| Water-soluble Organic Compound | Glycerol | 10 | 13 | 10 | 12 | 10 | 10 | 12 | 10 | 8 | 10 | 10 | 10 | 13 | 10 | 12 | 10 | 10 | 10 | 13 | 10 | 18 | 10 | 10 |
| | Ethylene glycol | | | 6 | 8 | | | | | | | | | | | | | | | | | | | | |
| | Diethylene glycol | 10 | | 10 | 8 | | 10 | 6 | 4.95 | | | | 10 | | 10 | 8 | | 10 | 10 | 8 | 10 | 16 | | 10 |
| | Trimethylolpropane | | | | | | | | 3 | | | | | | | | | | | | 5 | | | | |
| | Triethylene glycol | | 7 | | | 4 | | | | | 5 | 5 | | 7 | | | 10 | | | 7 | | | 10 | |
| | 2-Pyrrolidone | | 3 | | | 10 | | 8 | | 8 | 10 | 10 | | | | | | | | 3 | | | | |
| | Ethylene urea | | | | | | | | | | 0.5 | 0.5 | | | | | | | | | | | | |
| | Acetylenol EH | 0.5 | 0.5 | 0.5 | 0.5 | 0.5 | 0.5 | 0.5 | | 0.2 | 0.5 | 0.5 | 0.5 | 0.5 | 0.5 | 0.5 | 0.5 | 0.5 | 0.5 | 0.5 | 0.5 | 0.5 | 0.5 | 0.5 |
| | Surfynol 465 | | | | | | | | 0.1 | | | | | | | | | | | | | | | |
| | Polyoxyethylene behenylether (EO 15) | | | | | | | | | | 0.5 | 0.5 | | | | | | | | | | | | |
| | Water | to 100 | to 100 | to 100 | to 100 | to 100 | to 100 | to 100 | to 100 | to 100 | to 100 | to 100 | to 100 | to 100 | to 100 | to 100 | to 100 | to 100 | to 100 | to 100 | to 100 | to 100 | to 100 | to 100 |
| Water-soluble Organic Compound (Total Amount) | | 20.5 | 23.5 | 28.5 | 28.5 | 24.5 | 20.5 | 26.5 | 18.05 | 16.2 | 26.5 | 26.5 | 20.5 | 20.5 | 20.5 | 20.5 | 20.5 | 20.5 | 20.5 | 36.5 | 20.5 | 34.5 | 20.5 | 20.5 |
| Characteristic Values | Viscosity | 3.1 | 3.2 | 3.10 | 3 | 3.3 | 3.5 | 2.3 | 2.10 | 2.5 | 2.7 | 2.8 | 3.1 | 1.8 | 2.90 | 1.8 | 3.1 | 3.5 | 3.1 | 3.2 | 2.90 | 3.3 | 3.1 | 3.5 |
| | η ave | | | 3.2 | | | | | 2.3 | | 2.8 | | | | 2.4 | | | | | | 2.6 | | | |
| | Difference from η ave (%) | 3.125 | 0 | 6.25 | 3 | −3.13 | −9.38 | 0 | 8.70 | −8.7 | −1.02 | 1.02 | 14.8 | 33.3 | 7.40 | 33.3 | 14.8 | 29.6 | 2.5 | 0.6 | 8.80 | 3.77 | 2.5 | 10.1 |
| | Pmax/Pmin | | | 8.33 | | | | | 3.15 | | 6.00 | | | | 8.33 | | | | | | 8.33 | | | |
| | Smin/Smax | | | 0.72 | | | | | 0.61 | | 1.00 | | | | 1.00 | | | | | | 0.56 | | | |
| | B/P | 0.5 | 2.4 | 1 | 3 | 0.44 | 0.75 | 0.55 | 1.36 | 0.4 | 1.4 | 10 | 0.5 | 0.5 | 1 | 1 | 0.6 | 0.75 | 0.5 | 0.5 | 1 | 1 | 0.6 | 0.75 |

Viscosity of the inks constituting the ink sets of the Examples and Comparative Examples were measured by an E-type viscometer model RE80L (Toki Industries, Inc.) at 25° C.

Variation of cleaning operation with respective inks was evaluated as follows. The inks constituting the ink sets of the Examples and Comparative Examples were filled into the ink tanks of an ink-jet printer (Product Name: BJF 8500; manufactured by Canon Inc.) and cleaning operation was repeated ten times successively. Then waste ink was weighed for each ink. As a result, there was little difference in the waste ink weight between inks of Examples 1 to 4. On the other hand, significant difference between inks of Comparative Example 1, particularly between the dark and light inks (that is, between M1 and LM1 and between C3 and LC2).

Next, light fastness of the images formed with the ink sets of Examples and Comparative Example was evaluated as follows. The inks constituting an ink set of Example 1 or Comparative Example were filled into the ink tanks of an ink-jet printer (Product Name: BJF 8500; manufactured by Canon Inc.) and a silver-halide photographic full-color printing was conducted on a normal paper (PPC paper manufactured by Canon Inc.). The resulted two printed papers were tested by using a light fastness test machine (Product Name: Super Xenon SX-75 manufactured by Suga Test Instruments Co., Ltd.) where the images were irradiated under a xenon lamp for 300 hours. Deterioration from the initial state was visually observed. As a result, in Comparative Example 1, substantial color change was observed, while color change of Example 1 was observed but still worth looking at.

Further, storage stability was tested as follows: 100 ml of the each ink constituting the ink sets of the Examples 1 to 4 was placed in a heat-resistant bottle, and the bottle was sealed and stored in a thermostatic chamber at 60° C. for one month. Viscosity and particle size were measured and compared with the initial state. As a result, no increase in viscosity nor agglomeration of the coloring material particles were observed with the ink sets of Examples 1 to 3 and therefore, these ink sets were confirmed to be excellent in storage stability. On the other hand, there were observed increase in viscosity and agglomeration of the coloring material particles in some of the inks among the inks constituting the ink set of Examples 4.

According to the present invention, provided is an ink set of all pigment inks that would not interfere the ink feeding mechanism and recovering mechanism of ink jet recording apparatus, and has a good storage stability.

Furthermore, the recording unit, ink-jet recording head and ink-jet recording method of the present invention enable good image recording for a long time.

What is claimed is:

1. An ink-jet recording method comprising the steps of:
   (i) providing an ink set comprising at least three aqueous inks for ink-jet recording, each of the aqueous inks comprising a water-insoluble coloring material, an aqueous medium, a dispersant for dispersing the coloring material in the aqueous medium, and a water-soluble organic compound, wherein:
   at least two inks of the at least three aqueous inks have the same hue;
   the at least two inks are different from each other in pigment concentration based on the total weight of each ink;
   the at least two inks have the same or substantially the same viscosity at an actual usage temperature (T1);
   Pmax/Pmin is not less than 3, where Pmax represents a highest concentration of the coloring material among the at least two inks and Pmin represents a lowest concentration of the coloring material among the at least two inks; and
   the ratio of the dispersant to the coloring material (B/P ratio) in an ink of a lower coloring material concentration is larger than the B/P ratio in an ink of a higher coloring material concentration;
   (ii) discharging each of the at least three aqueous inks by an ink-jet recording method using ink-jet recording heads; and
   (iii) conducting a suction/recovery operation for the ink-jet recording heads by sucking the at least three aqueous inks with a common suction/recovery means.

2. The ink-jet recording method according to claim 1, wherein the viscosity of the at least two inks each falls in the range of $\eta ave \pm 15\%$ where $\eta ave$ is an average of the viscosity of the at least two inks at the actual usage temperature (T1).

3. The ink-jet recording method according to claim 2, wherein the $\eta ave$ at 25° C. is in a range of 2.0 mPa·s to 3.5 mPa·s.

4. The ink-jet recording method according to claim 1, wherein the at least two inks contain the same or substantially the same concentration of a water-soluble organic compound based on the total weight of each ink.

5. The ink-jet recording method according to claim 1, wherein Smin/Smax is not less than 0.6 where Smax represents a highest concentration of the water-soluble organic compound among the at least two inks while Smin is a lowest concentration of the water-soluble organic compound among the at least two inks.

6. The ink-jet recording method according to claim 1, wherein the dispersant is a resinous dispersant comprising a block copolymer.

7. An ink-jet recording apparatus comprising:
   a plurality of ink tanks for containing an ink set comprising at least three aqueous inks, each ink tank containing one of the at least three aqueous inks;
   a plurality of ink-jet recording heads for discharging each of the at least three aqueous inks contained in the respective ink tanks by an ink-jet recording method; and
   means for conducting a common suction/recovery operation for the ink-jet recording heads by sucking the at least three aqueous inks,
   wherein each of the aqueous inks comprises a water-insoluble coloring material, an aqueous medium, a dispersant for dispersing the coloring material in the aqueous medium, and a water-soluble organic compound, wherein:
   at least two inks of the at least three aqueous inks have the same hue;
   the at least two inks are different from each other in pigment concentration based on the total weight of each ink;
   the at least two inks have the same or substantially the same viscosity at an actual usage temperature (T1);
   Pmax/Pmin is not less than 3, where Pmax represents a highest concentration of the coloring material among the at least two inks and Pmin represents a lowest concentration of the coloring material among the at least two inks; and
   the ratio of the dispersant to the coloring material (B/P ratio) in an ink of a lower coloring material concentration is larger than the B/P ratio in an ink of a higher coloring material concentration.

8. The ink jet recording method according to claim 1, wherein the water-soluble organic compound is a surfactant.

9. The ink-jet recording apparatus according to claim 7, wherein the water-soluble organic compound is a surfactant.

10. The ink-jet recording apparatus according to claim 7, wherein the dispersant is resinous dispersant comprising a block copolymer.

* * * * *

UNITED STATES PATENT AND TRADEMARK OFFICE
CERTIFICATE OF CORRECTION

| | |
|---|---|
| PATENT NO. | : 7,055,943 B2 |
| APPLICATION NO. | : 10/214584 |
| DATED | : June 6, 2006 |
| INVENTOR(S) | : Mariko Suzuki et al. |

Page 1 of 1

It is certified that error appears in the above-identified patent and that said Letters Patent is hereby corrected as shown below:

COLUMN 4:
Line 48, "reological" should read --rheological--.

COLUMN 7:
Line 2, "Water-soluble" should begin a new paragraph
Line 26, "alocohol;" should read --alcohol;--.

COLUMN 8:
Line 62, "possible" should read --possible to have--.

COLUMN 12:
Line 57, "an" should read --a--.

COLUMN 19:
Line 12, "significant" should read --there was significant--.
Line 44, "interfere" should read --interfere with--.

Signed and Sealed this

Eighth Day of May, 2007

JON W. DUDAS
*Director of the United States Patent and Trademark Office*